United States Patent [19]

Colarossi

[11] Patent Number: 4,991,435
[45] Date of Patent: Feb. 12, 1991

[54] ELECTRONIC FUEL GAUGE SYSTEM

[75] Inventor: Vincent Colarossi, Dearborn, Mich.

[73] Assignee: Ford Motor Company, Dearborn, Mich.

[21] Appl. No.: 402,377

[22] Filed: Sep. 5, 1989

[51] Int. Cl.⁵ .............................................. G01F 23/00
[52] U.S. Cl. ..................................... 73/313; 73/304 R
[58] Field of Search ............ 73/304 R, 313; 307/359, 307/491, 494, 493

[56]  References Cited

U.S. PATENT DOCUMENTS

| | | | |
|---|---|---|---|
| 3,886,518 | 5/1975 | Borsian | 340/450 |
| 3,938,117 | 2/1976 | Borsian . | |
| 4,497,205 | 2/1985 | Zulauf et al. | 73/313 |
| 4,513,277 | 4/1985 | Moore et al. . | |
| 4,622,482 | 11/1986 | Ganger | 307/585 |
| 4,635,043 | 1/1987 | Kronerberg et al. | 340/618 |
| 4,760,736 | 8/1988 | Huynh | 73/313 |
| 4,838,082 | 6/1989 | McCoy et al. | 73/313 |
| 4,857,863 | 8/1989 | Ganger et al. | 330/264 |

FOREIGN PATENT DOCUMENTS 484198 9/1975 Australia ........................... 73/304 R

OTHER PUBLICATIONS

*National Semiconductor*, Appendix A, "The Monolithic Operational Amplifier: A Tutorial Study", pp. 1180–1200.

*Primary Examiner*—William A. Cuchlinski, Jr.
*Assistant Examiner*—W. Morris Worth
*Attorney, Agent, or Firm*—Roger L. May; Mark L. Mollon

[57]  ABSTRACT

A liquid level indicating system particularly applicable to monitoring the fuel level in a motor vehicle includes an anti-slosh feature incorporated into a system amplifier to substantially eliminate fluctuations in the fuel level indicated by a fuel gauge driven by the amplifier. The anti-slosh feature is provided by limiting the slew rate of the amplifier during normal operation of the system. The slew rate is limited by using a limited current source to provide dc bias current within the amplifier such that the output can change only at the limited slew rate. To make the system respond rapidly upon start up of a vehicle including the system, the normally limited current source is supplemented by a secondary current source which provides substantially higher dc bias current within the amplifier and accordingly a substantially higher slew rate for the amplifier. The secondary current source is activated for a defined period of time to allow the fuel gauge to initialize, and then is disabled such that the amplifier is thereafter slew rate limited to correct for fuel slosh.

20 Claims, 3 Drawing Sheets

ELECTRONIC FUEL GAUGE SYSTEM

BACKGROUND OF THE INVENTION

The present invention relates generally to a liquid level indicating system and, more particularly, to such a system for monitoring liquid level variations produced by consumption of the liquid substantially independent of relatively rapid variations in the liquid level due to unavoidable transient disturbances. The system is particularly applicable to measuring the fuel level in a motor vehicle fuel tank and accordingly will be described with reference to this application herein.

Fuel gauge systems have been provided on motor vehicles for many years. A basic gauge system includes a liquid level sensor in the fuel tank and a gauge connected to indicate to the driver the status of the sensor unit and therefor the fuel level. Unfortunately, transient variations of the fuel level, referred to herein as fuel "slosh", are created by the normal operation of the vehicle and interfere with accurate fuel level registration by the gauge. Accordingly, a variety of damping arrangements have been incorporated into the gauge systems to eliminate rapid transient movements of the fuel gauge due to fuel slosh so that the driver can accurately monitor vehicle fuel level. Damping arrangements include mechanical damping devices associated with the level sensor in the fuel tank, the fuel level gauge or both. More commonly in modern gauge systems, electrical damping circuitry is provided.

Examples of prior art damping arrangements include, U.S. Pat. No. 3,886,518 which discloses a tilt switch for bypassing a magnetic fuel gauge under conditions leading to fuel slosh. U.S. Pat. No. 4,635,043 discloses a fuel gauge wherein a fuel level dependent voltage is fed through an integrator circuit having a suitable time constant to transform input voltage surges due to fuel slosh into a slowly changing output voltage which is used to drive the fuel gauge. The integrator circuit is temporarily bypassed to initialize the fuel gauge. In U.S. Pat. No. 4,760,736, the signal from a level sensor is passed through a low pass RC filter to a display in a vehicle. A resistor of the RC filter is temporarily bypassed to initialize the display.

Problems with stability, calibration, repeatable performance and the like lead to the replacement of mechanical devices with electrical damping circuitry. Unfortunately, many of the electrical damping circuits Provided to this time are relatively complicated and hence expensive to produce and service. In addition, subtle errors are introduced by conventional RC type timing circuits such that the damping characteristics change dependent upon the history of the input signal.

Accordingly, an improved liquid level indicating system is needed which will provide a consistent damping characteristic and be simple and inexpensive to produce and service. Preferably, the improved system will facilitate production of the damping circuitry as an integrated circuit to still further reduce costs, ease production and service, and add to the versatility of the system.

SUMMARY OF THE INVENTION

This need is met by the liquid level indicating system of the present invention which includes an anti-slosh feature incorporated into a system amplifier to substantially eliminate fluctuations in the fuel level indicated by a fuel gauge driven by the amplifier. In accordance with the present invention, the anti-slosh feature is provided by limiting the slew rate of the amplifier during normal operation of the system. The slew rate is limited by using a limited current source to provide dc bias current within the amplifier. Accordingly, while the input to the amplifier can change at any rate, the output can change only at the limited slew rate which is set by the limited current source. To make the system respond rapidly upon start up of a vehicle including the system, the normally limited current source is supplemented by a secondary current source which Provides substantially higher dc bias current within the amplifier and accordingly a substantially higher slew rate for the amplifier. The secondary current source is activated for a defined period of time to allow the fuel gauge to initialize, and then is disabled such that the amplifier is slew rate limited to correct for fuel slosh.

In accordance with one aspect of the present invention, a liquid level indicating system for use in an environment such as a motor vehicle wherein the liquid level is subjected to relatively rapid variations compared to the variations which are produced by consumption of the liquid comprises a sensor for generating a signal representative of the liquid level and a liquid level signaling gauge. Amplification means are interconnected between the sensor and the gauge for amplifying the signal, with the amplification means being slew rate limited to substantially eliminate the rapid variations from the signal.

The liquid level indicating system is typically activated by switch means, such as a motor vehicle ignition switch, for selectively powering the system. Where the system is thus configured such that it can be turned on and off, preferably the amplification means comprises slew rate control means for changing the slew rate of the amplification means to rapidly initialize the fuel gauge upon activation of the switch means. The slew rate control means may comprise first and second current source means for setting dc bias current within the amplification means. For this configuration, the first current source means limits current to set the slew rate of the amplification means at a level which substantially eliminates the rapid variations in the signal and the second current source means provides additional dc bias current to increase the slew rate for rapid initialization of the fuel gauge of the system. Timer means may be provided for enabling the second current source means for a selected period of time upon activation of the switch means. The timer means may comprise a timer circuit or a resistor-capacitor (RC) circuit and a comparator circuit. The amplification means including the first current source means and the second current source means may be combined into an integrated circuit. Preferably, the timer means, the amplification means, the first current source means and the second current source means are combined into an integrated circuit.

In accordance with another aspect of the present invention, a liquid level indicating system comprises a sensor for generating a signal having a magnitude corresponding to the liquid level and a liquid level signaling gauge. Amplification means are interconnected between the sensor and the gauge for amplifying the signal. First current source means provides dc bias current within the amplification means with the first current source means being limited to a defined current to thereby limit the slew rate of the amplification means to substantially eliminate transient variations in the amplified signal resulting from sloshing of the liquid. The system may further comprise second current source means for providing supplemental dc bias current within the amplification means with the second current source means providing sufficient current to substantially increase the slew rate of the amplification means for initialization of the gauge upon power up of the liquid level indicating system. Timer means enable the second current source means for a defined initialization time period upon power up of the liquid level indicating system and thereafter disable the second current source means. The amplification means, the first current source means and the second current source means may be combined into an integrated circuit. Preferably, the timer means, the amplification means, the first current source means and the second current source means are combined into an integrated circuit.

In accordance with yet another aspect of the present invention, a liquid level indicating system for use in an environment such as a motor vehicle wherein the liquid level is subjected to relatively rapid variations compared to the variations which are produced by consumption of the liquid comprises a sensor for generating a signal representative of the liquid level, a liquid level signaling gauge and amplification means interconnected between the sensor and the gauge for amplifying the signal. Slew rate control means are coupled to the amplification means for limiting the slew rate of the amplification means to substantially eliminate the rapid variations from the amplified signal. The slew rate control means may comprise first and second current source means for setting dc bias current within the amplification means, the first current source means limiting current to a level to set the slew rate of the amplification means at a level to substantially eliminate the rapid variations from the amplified signal and the second current source means providing additional current to increase the slew rate for rapid initialization of the liquid level indicating system.

According to preferred embodiments, it is an object of the present invention to provide an improved liquid level indicating system which includes an anti-slosh feature coupled to a system amplifier connected between a liquid level sensor and a liquid level indicating gauge to substantially eliminate fluctuations in the level indicated by the gauge; to provide an improved liquid level indicating system which includes an anti-slosh feature provided by limiting the slew rate of an amplifier connected between a liquid level sensor and a liquid level indicating gauge to substantially eliminate fluctuations in the level indicated by the gauge; to provide an improved liquid level indicating system which includes an anti-slosh feature provided by setting dc bias current within an amPlifier connected between a liquid level sensor and a liquid level indicating gauge via a first limited current source to limit the slew rate of the amplifier and thereby substantially eliminate fluctuations in the level indicated by the gauge; and, to provide an improved liquid level indicating system which includes an anti-slosh feature provided by limiting dc bias current within an amplifier connected between a liquid level sensor and a liquid level indicating gauge via a first limited current source to limit the slew rate of the amplifier and thereby substantially eliminate fluctuations in the level indicated by the gauge and to temporarily supplement the limited dc bias current within the amplifier via a second current source to initialize the gauge indication upon power up.

Other objects and advantages of the invention will be apparent from the following description, the accompanying drawings and the appended claims.

BRIEF DESCRIPTION OF THE DRAWINGS

FIG. 4 shows a resistor-capacitor (RC) circuit which will be analyzed hereinafter.

DETAILED DESCRIPTION OF THE INVENTION

Figure 2:
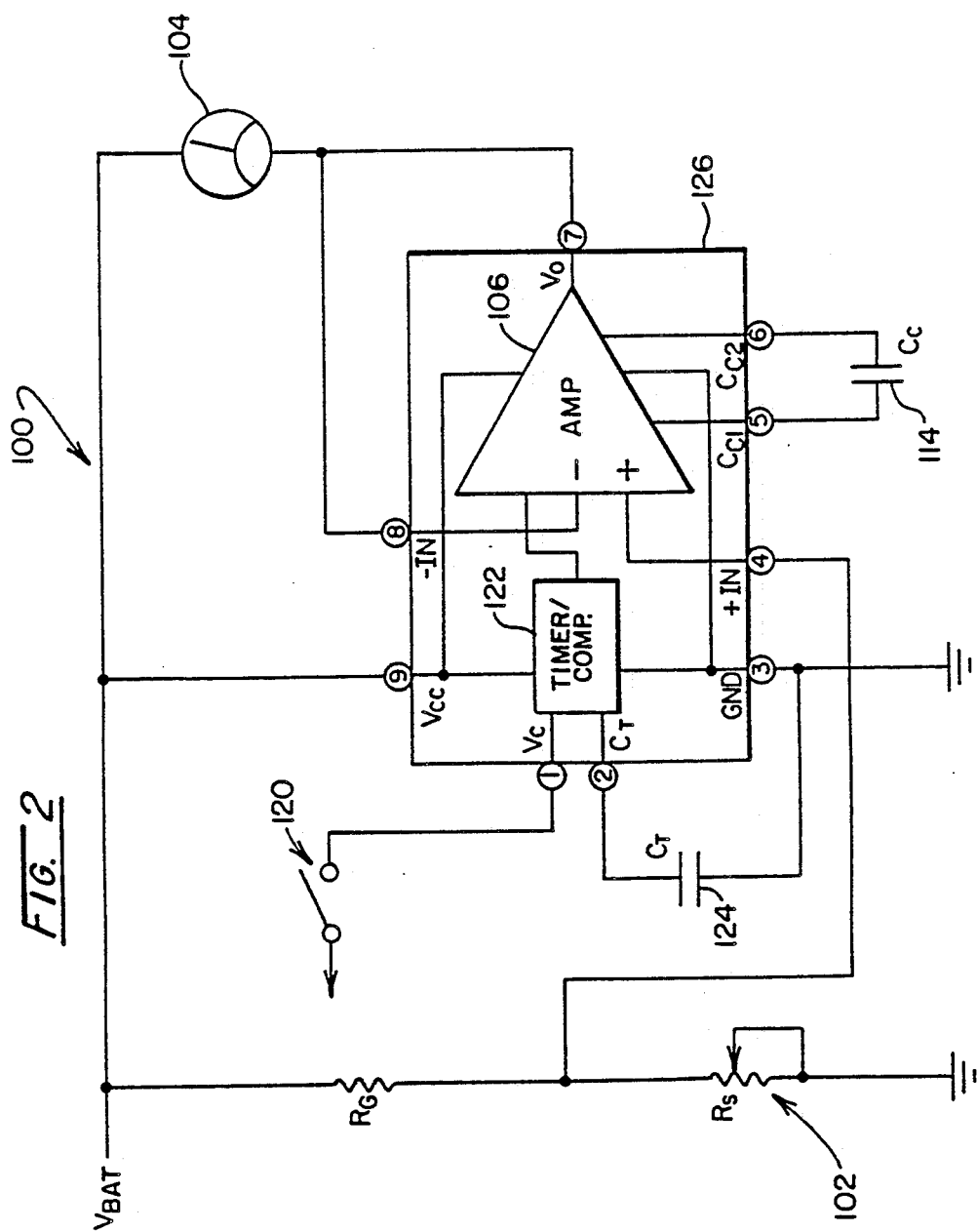
FIGS. 2 and 3 are schematic block diagrams of two embodiments of electronic fuel gauge systems in accordance with the present invention illustrating an integrated circuit which includes the operational amplifier of FIG. 1 and associated timer circuitry to further adapt that amplifier for use is such electronic fuel gauge systems.
Figure 3:
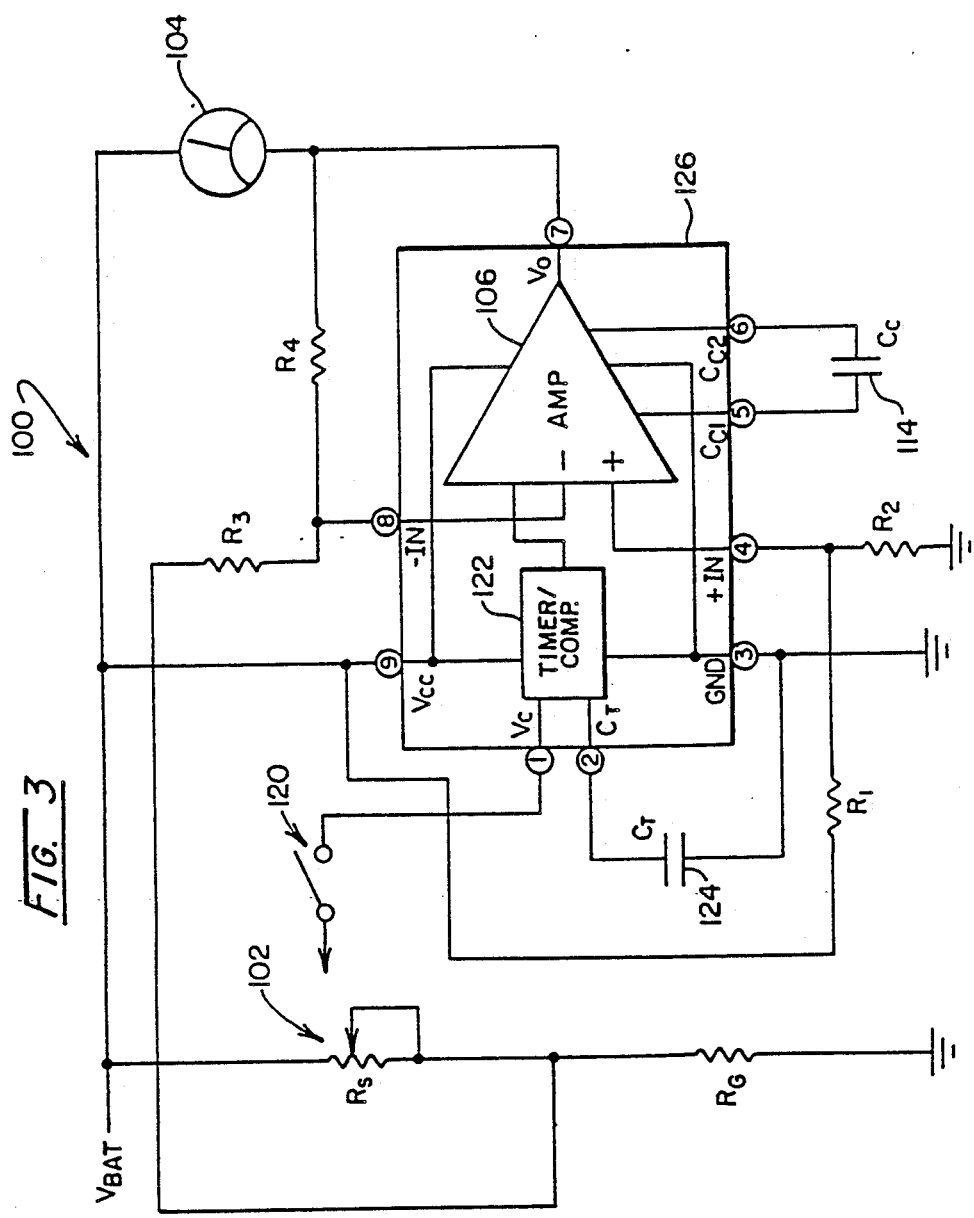

Two of a number of possible alternative embodiments of a liquid level indicating system 100 in accordance with the present invention are shown in FIGS. 2 and 3. The system 100 is intended for use in an environment in which the liquid level is subjected to relatively rapid variations compared to the variations which are to be monitored by the system. While generally applicable for measuring liquid levels, the system 100 is Particularly applicable for measuring fuel levels in a motor vehicle and accordingly will be described with reference to this application.

Figure 1:
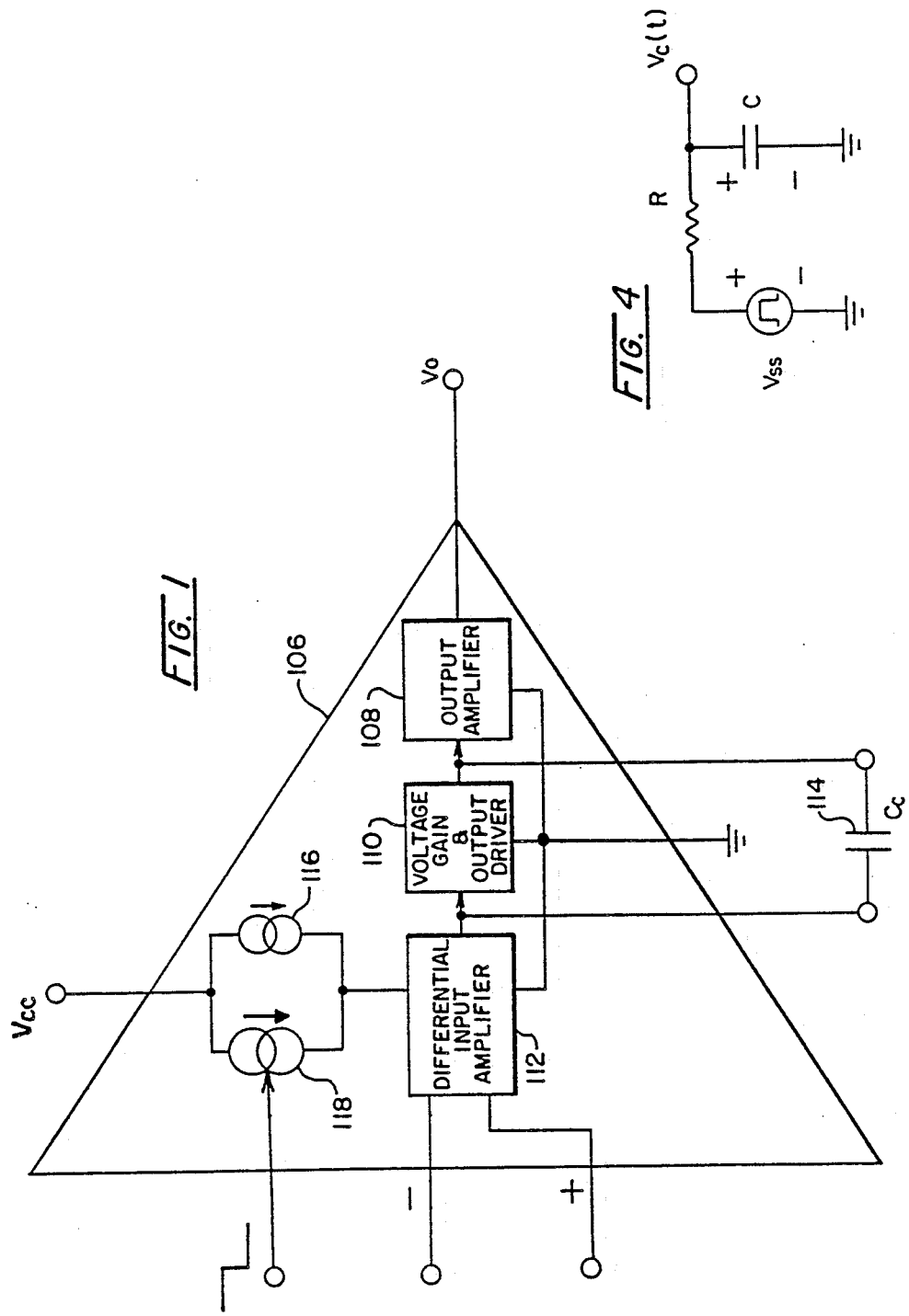
FIG. 1 is a schematic block diagram of an operational amplifier including selective slew rate control particularly applicable to an electronic fuel gauge system in accordance with the present invention.

The system 100 comprises a sensor 102 for generating a signal representative of the fuel level within a vehicle tank (not shown) and a fuel level signaling gauge 104. Amplification means comprising the operational amplifier 106 in the illustrated embodiments and shown in detail in FIG. 1, is interconnected between the sensor 102 and the gauge 104 for amplifying the signal generated by the sensor 102. The amplifier 106 is slew rate limited to substantially eliminate rapid variations in the signal generated by the sensor 102 by fuel slosh due to the normal operating movements of the vehicle before the signal is applied to the gauge 104. The slew rate of an amplifier is the rate at which the amplifier can change or swing its output voltage level. The slew rate is determined by the current available to charge capacitance within and associated with the amplifier, for example the current available from the input stage of an operational amplifier and the amplifier compensation capacitor.

The operational amplifier 106 is structured in accordance with well known analog/integrated circuit technology and includes an output amplifier stage 108, voltage gain and output driver stage 110 and differential input amplifier stage 112. A compensation capacitor 114 is externally connected to the amplifier 106 also in a conventional manner. However, the operational amplifier 106 includes slew rae control means comprising first and second current source means for setting dc bias currents within the amplifier 106 and in particular within the input amplifier stage 112.

The first current source means comprises a current source circuit 116 which limits dc bias current within the input amplifier stage 112 of the amplifier 106. The rate at which the limited dc bias current from the current source circuit 116 charges the compensation capacitor 114 and any other parasitic capacitance within the circuit determines the slew rate of the amplifier 106. The slew rate is set by the current source 116 (and the selection of the capacitor 114) at a level which substantially eliminates the rapid variations in the signal generated by the sensor 102.

The second current source means comprises a current source circuit 118 which provides additional dc bias current to increase the slew rate for rapid initialization of the gauge 104 and hence the liquid level indicating system 100. It is noted that the second current source circuit 118 is preferred for the motor vehicle application, but is not required for all applications of the present invention, such as where the system is continuously powered.

The liquid level indicating system 100 may further comprise switch means such as an ignition switch 120 for selectively powering the system 100 by connecting either power or ground to the system dependent upon the power requirements of the system components. When the system 100 is selectively powered, it may be rapidly initialized upon power-up by activating the second current source circuit 118 for an initial period of time. For this purpose, the system 100 can further comprise timer means for enabling the second current source circuit 118 for a selected period of time upon activation of the switch 120. The timer means can comprise any appropriate timer circuit such as the timer circuit 122 which is shown in FIGS. 2 and 3. The timer circuit 122 is indicated as a timer/comparator and utilizes a timing capacitor 124 as illustrated. The timer circuit can be a simple RC circuit in combination with a comparator circuit, a more sophisticated pulse timer circuit, a monopulser or other appropriate circuit which can initially activate the second current source 118 for a selected period of time upon activation of the switch 120 and then deactivate it.

As shown in FIG. 1, the operational amplifier 106 incorporating the current source circuits 116 and 118 can be formed as an integrated circuit in and of itself. Such formation of the amplifier 106 permits potentially wider utilization of the integrated circuit for applications other than the electronic fuel gauge system of the present invention. Alternately and preferably for use in a fuel gauge system, the operational amplifier 106 and the timer circuit 122 are combined into a single integrated circuit 126. However, if the timer circuit 122 is combined with the operational amplifier 106 into the integrated circuit 126, the structure of the timer circuit is dictated or at least must be compatible with the structure selected for the operational amplifier 106 as will be apparent to those skilled in the art. The 9 pin count of the integrated circuit 126 can be accommodated by existing integrated circuit packages. Alternately, by selecting a single system architecture with a specified input to output topology, the pin count can be reduced to 8, for example in FIG. 2 pins 7 and 8 can be internally connected.

While a large number of alternate configurations are available for the system 100, two embodiments are shown in FIGS. 2 and 3. These systems illustrate non-inverting and inverting operation of the amplifier 106, respectively. While the systems of FIGS. 2 and 3 show the gauge 104 as being connected to $V_{BAT}$ referred to as "low-side" drive systems, it will be apparent to those skilled in the art that comparable systems can be configured with the gauge 104 connected to ground referred to as "high-side" drive systems. Further, a large number of system configurations will be apparent utilizing either the operational amplifier 106 or the integrated circuit 126.

Subtle errors are introduced to system performance by RC time constant techniques presently used in anti-slosh systems. These errors will now be illustrated by reference to an RC circuit to which a step function is applied to represent extreme fuel slosh conditions, see FIG. 4. The response of an RC circuit to a voltage step input signal is:

$$V_c(t) = V_{ss} - [(V_{ss} - V_c(O)) * e^{(-t/(R*C))}]_{ps}$$

Where $V_c(t)$ is the output voltage of the RC circuit; $V_{ss}$ is the steady state input voltage magnitude; $V_c(O)$ is the initial voltage across the capacitor before switching takes place; R is the resistance is ohms; and, C is the capacitance in farads. Solving for t yields:

$$t = -R*C*ln[(V_c(t) - V_{ss})/(-V_{ss} + V_c(O))]$$

where the change in time due to fuel slosh becomes:

$$dt = -R*C*ln[(V_c(t) - V_{ss})/(-V_{ss} + dV_c(0))]$$

From these equations, it is apparent that systems utilizing this RC filter response will have varying values of charging and discharging times for the same step response due to the initial system condition of $V_c(O)$. Accordingly, fuel anti-slosh systems using this type of filtering between the sensor and the gauge will exhibit this error in response time such that the response of the system is dependent on fuel slosh. The liquid level indicating system of the present invention eliminates this error by providing a system response which is constant, i.e. set by the slew rate of the amplifier 106, regardless of the history or slosh within the fuel tank.

In the present invention a conventional operational amplifier is modified to produce a slew rate limited response or time lag to the fuel monitoring system The slew rate limiting of the amplifier will affect the fuel sensor signal only when the signal changes at a rate which is greater than the slew rate. The slew rate filtering effect is characterized and can be controlled by the selection of the first current source 116 and the compensation capacitor 114. The slew rate is increased for initialization by temporarily activating the second current source 118 upon activation of the switch 120 such as upon start up of a motor vehicle. In this way, the fuel gauge will quickly reach a level corresponding to the fuel level in the vehicle tank and thereafter, after the second current source 118 is disabled, accurately reflect the fuel level irrespective of interference generated by fuel slosh.

Having thus described the electronic fuel gauge system of the present invention in detail and by reference to preferred embodiments thereof, it will be apparent that modifications and variations are possible without departing from the scope of the invention defined in the appended claims.

What is claimed is:
1. A liquid level indicating system for use in an environment such as a motor vehicle wherein the liquid level is subjected to relatively rapid variations compared to the variations which are produced by consumption of the liquid, said system comprising:
 a sensor for generating a signal representative of the liquid level;

a liquid level signaling gauge; and amplification means interconnected between said sensor and said gauge for amplifying said signal, said amplification means being slew rate limited to substantially eliminate the rapid variations in said signal, the slew rate of said amplification means being substantially constant.

2. A liquid level indicating system as claimed in claim 1 further comprising switch means for selectively powering said system, and wherein said amplification means comprises slew rate control means for increasing the slew rate of said amplification means to a higher substantially constant slew rate to rapidly initialize said liquid level signaling gauge upon activation of said switch means.

3. A liquid level indicating system as claimed in claim 2 wherein said slew rate control means comprises first and second current source means for setting dc bias currents within said amplification means, said first current source means limiting current to limit the slew rate of said amplification means to a level which substantially eliminates rapid variations from said signal and said second current source means providing additional current to increase the slew rate for rapid initialization of said liquid level indicating system.

4. A liquid level indicating system as claimed in claim 3 wherein said amplification means including said first current source means and said second current source means are combined into an integrated circuit.

5. A liquid level indicating system as claimed in claim 3 wherein said system further comprises timer means for enabling said second current source means for a selected period of time upon activation of said switch means.

6. A liquid level indicating system as claimed in claim 5 wherein said timer means comprises a timer circuit.

7. A liquid level indicating system as claimed in claim 6 wherein said timer circuit comprises a resistor-capacitor circuit and a comparator circuit.

8. A liquid level indicating system as claimed in claim 5 wherein said timer means and said amplification means including said first current source means and said second current source means are combined into an integrated circuit.

9. A liquid level indicating system comprising:

a sensor for generating a signal having a magnitude corresponding to the liquid level;

a liquid level signaling gauge;

amplification means interconnected between said sensor and said gauge for amplifying said signal; and first current source means for setting dc bias current within said amplification means, said first current source means being limited to a defined current to thereby limit the slew rate of said amplification means to substantially eliminate transient variations from said signal resulting from sloshing of said liquid.

10. A liquid level indicating system as claimed in claim 9 further comprising:

second current source means for providing supplemental dc bias current within said amplification means, said second current source means providing sufficient current to increase the slew rate of said amplification means for initialization of said gauge upon power up of said liquid level indicating system; and timer means for enabling said second current source means for a defined initialization time period upon power up of said liquid level indicating system, said second current source means being disabled thereafter.

11. A liquid level indicating system as claimed in claim 10 wherein said amplification means, said first current source means and said second current source means are combined into an integrated circuit.

12. A liquid level indicating system as claimed in claim 10 wherein said timer means, said amplification means, said first current source means and said second current source means are combined into an integrated circuit.

13. A liquid level indicating system for use in an environment such as a motor vehicle wherein the liquid level is subjected to relatively rapid variations compared to the variations which are produced by consumption of the liquid, said system comprising:

a sensor for generating a signal representative of the liquid level;

a liquid level signaling gauge;

amplification means interconnected between said sensor and said gauge for amplifying said signal; and slew rate control means coupled to said amplification means for limiting the slew rate of said amplification means to substantially eliminate the rapid variations from said signal, the slew rate of said amplification means being substantially constant.

14. A liquid level indicating system as claimed in claim 13 further comprising switch means for selectively powdering said system such that one of at least two substantially constant slew rates are selected for said amplification means.

15. A liquid level indicating system as claimed in claim 14 wherein said slew rate control means comprises first and second current source means for setting dc bias currents within said amplification means, said first current source means limiting current to set the slew rate of said amplification means to a level which substantially eliminates the rapid variations from said signal and said second current source means providing additional current to increase the slew rate for rapid initialization of said liquid level indicating system.

16. A liquid level indicating system as claimed in claim 15 wherein said amplification means including said first current source means and said second current source means are combined into an integrated circuit.

17. A liquid level indicating system as claimed in claim 15 wherein said system further comprises timer means for enabling said second current source means for a selected period of time upon activation of said switch means.

18. A liquid level indicating system as claimed in claim 17 wherein said timer means comprises a timer circuit.

19. A liquid level indicating system as claimed in claim 18 wherein said timer circuit comprises a resistor-capacitor circuit and a comparator circuit.

20. A liquid level indicating system as claimed in claim 17 wherein said timer means and said amplification means including said first current source means and said second current source means are combined into an integrated circuit.

* * * * *

UNITED STATES PATENT AND TRADEMARK OFFICE
CERTIFICATE OF CORRECTION

PATENT NO. : 4,991,435

DATED : February 12, 1991

INVENTOR(S) : Vincent Colarossi

It is certified that error appears in the above-identified patent and that said Letters Patent is hereby corrected as shown below:

The formula in column 6, line 13, should read:

-- $V_c(t) = V_{ss} - [(V_{ss} - V_c(0)) * e^{(-t/(R*C))}]$ --.

Signed and Sealed this

Twenty-ninth Day of December, 1992

*Attest:*

DOUGLAS B. COMER

*Attesting Officer*   *Acting Commissioner of Patents and Trademarks*